United States Patent
Erickson

[11] 3,878,496
[45] Apr. 15, 1975

[54] SELECTABLE LEVEL ALARMING PERSONAL DOSIMETER

[75] Inventor: Gerlad L. Erickson, Rictiland, Wash.

[73] Assignee: The United States of America as represented by the Administrator of the Energy Research and Development Administration, Washington, D.C.

[22] Filed: June 14, 1971

[21] Appl. No.: 152,836

[52] U.S. Cl. ............... 250/336; 250/374; 250/388; 340/227 R
[51] Int. Cl. .............................................. G01t 1/16
[58] Field of Search... 250/83.3 R, 83.3 PD, 83.6 R, 250/336, 374, 388; 340/227 R

[56] References Cited
UNITED STATES PATENTS

| | | | |
|---|---|---|---|
| 2,728,861 | 12/1955 | Glass | 250/83.6 R |
| 3,019,339 | 1/1962 | Wesley | 250/83.6 R |
| 3,443,097 | 5/1969 | Smith | 250/83.6 R |
| 3,614,442 | 10/1971 | Brodsky | 250/83.3 PD |

Primary Examiner—James W. Lawrence
Assistant Examiner—Davis L. Willis
Attorney, Agent, or Firm—John A. Horan; Arthur A. Churm; Walter L. Rees

[57] ABSTRACT

A pocket type personal dosimeter with selectable dose alarm points is described. The dosimeter uses digital integration to measure the accumulated radiation dose and an audible alarm is provided when a preselected dose has been exceeded. In addition, test circuits are provided and the dosimeter develops an alarm when the dose rate exceeds a predetermined level even though the accumulated dose is less than the preset level.

15 Claims, 2 Drawing Figures

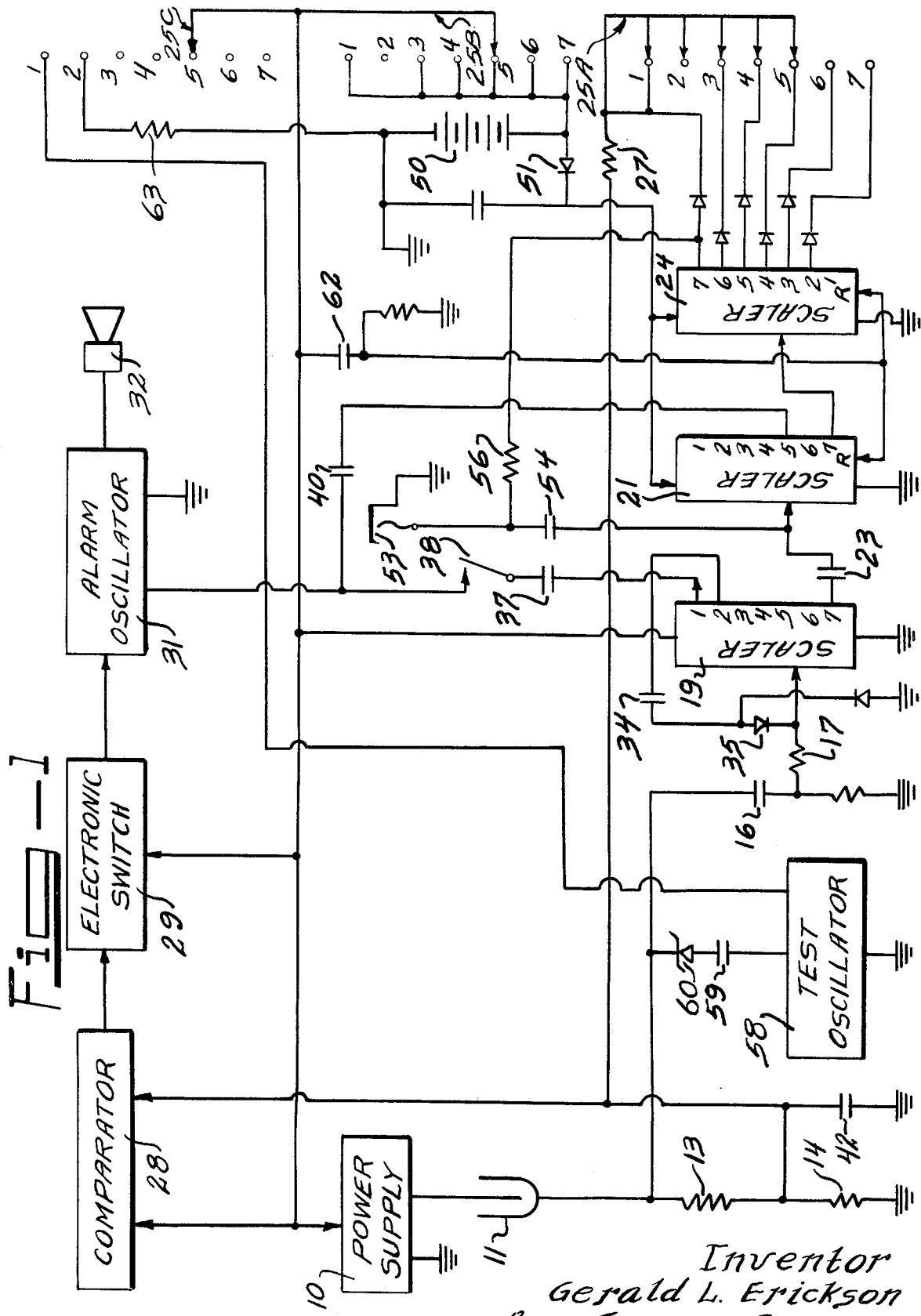

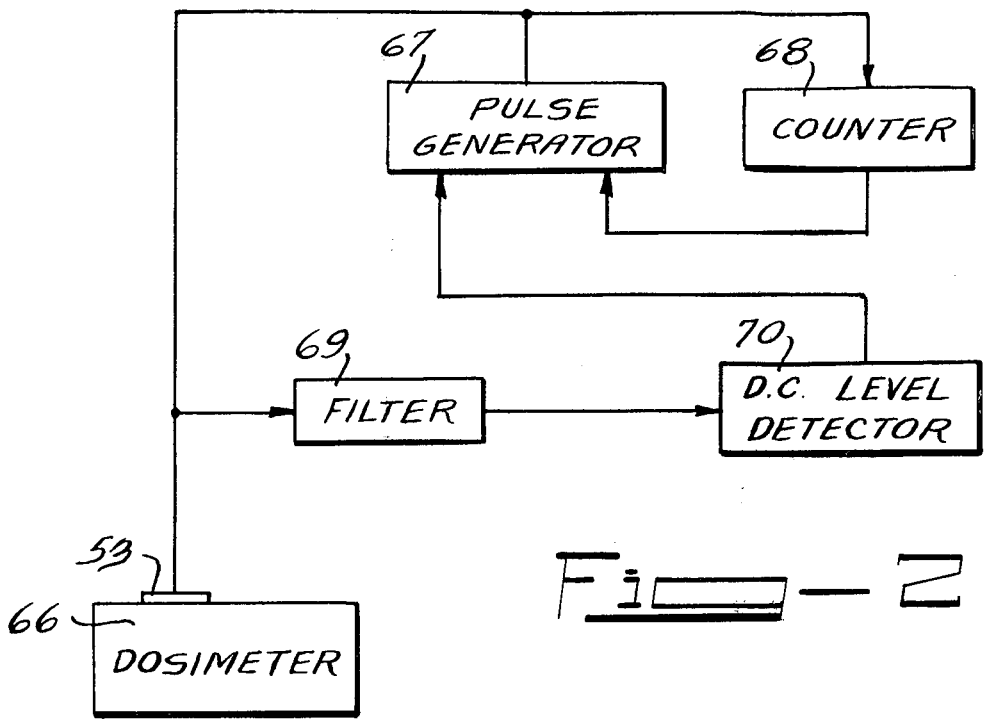

SELECTABLE LEVEL ALARMING PERSONAL DOSIMETER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

With the advent of large scale atomic energy programs, there has been a need for a reliable method of warning personnel in a radiation zone, on an individual basis, when either a preset dose rate or an accumulated dose is reached. Over the years numerous dosimeters have been developed for personnel protection. Passive types of dosimeters, such as film badges, provide a measure of the accumulated dose but do not give an alarm when this dose is reached and do not indicate the dose rate. Electronic dosimeters have been developed which will measure the accumulated dose and give an alarm when the accumulated dose has reached a preset level. These dosimeters use capacitors for integration of the dose over a period of time to measure the accumulated dose. Capacitors are not entirely satisfactory integrators as extra circuitry is required to perform linear integration with the capacitor and the charge developed by each radiation event must be equal. Capacitor leakage also makes it difficult to store the accumulated dose over long periods of time until a measurement of the dose can be made. The dielectric stress of a charged capacitor makes it difficult to discharge the capacitor to zero voltage to reset the dosimeter.

It is also desirable to give the person wearing the dosimeter simple test features so that he can determine that the dosimeter is operating properly. A dose rate alarm should also be incorporated so that a warning is given when the dose rate exceeds a safe value.

It is therefore an object of this invention to provide a personal dosimeter using digital integration.

Another object of this invention is to provide a personal dosimeter which will give an audible alarm when a preset dose is accumulated.

Another object of this invention is to provide a personal dosimeter in which the accumulated dose is stored in the dosimeter when the power is off.

Another object of this invention is to provide a personal dosimeter which will give an audible alarm if the dose rate exceeds a predetermined value.

Another object of this invention is to provide a personal dosimeter having simple test features to determine proper operation of the dosimeter.

SUMMARY OF THE INVENTION

In practicing this invention a personal pocket dosimeter is provided which uses scalers to count the accumulated dose. Radiation is detected as a series of pulses by a Geiger-Mueller tube and the pulse train is coupled to a counting circuit which counts the individual pulses. When the accumulated dose reaches a preset level, an audible alarm is operated to indicate to the wearer that the preset level has been reached. The accumulated dose counted by the scalers is maintained in the storage unit with the power turned off so that the accumulated dose can be read out as desired.

A test oscillator is provided to check the operation of the dosimeter. In addition, test pulses can be fed into the dosimeter to preset the stages at some desired value. A crackle test is provided to indicate proper operation of the dosimeter in a radiation field and an additional feature provides a chirp sound every time a predetermined unit of dose is accumulated. The dosimeter also develops a voltage dependent upon the dose rate and when this voltage exceeds a predetermined value the dosimeter alarm is actuated.

BRIEF DESCRIPTION OF THE DRAWINGS

The invention is shown in the drawings of which:

FIG. 1 is a partial block diagram and a partial schematic of the personal dosimeter of this invention; and FIG. 2 is a block diagram of the dose measuring and preset feature of this invention.

DETAILED DESCRIPTION OF THE INVENTION

Referring to the drawing a power supply 10 provides a high voltage potential to Geiger-Mueller tube 11. Radiation striking GM tube 11 causes ionization therein which develops a current through resistors 13 and 14. Each ionizing event develops a pulse across resistors 13 and 14 which is coupled through capacitor 16 and resistor 17 to seven stage scaler 19.

Scaler 19 counts the pulses received and upon receiving the 128th pulse transfers a pulse to scaler 21 through capacitor 23. Scaler 21 continues to count the pulses and upon the receipt of the $2^{14}$ pulse transfers a pulse to scaler 24. Each scaler has 7 stages and therefore the total count which the scalers can handle in this example is $2^{21}$ pulses. The outputs of the various stages of scaler 24 provide the selectable alarm points.

With no feedback in the circuit of scaler 24, the output of the seventh or last stage represents a dose of 788.16 mR. This is rounded off to a figure of 800 mR for purposes of calibrating the pocket dosimeter. Since the scaler 24 is a binary counter the sixth stage represents a dose half the output of the seventh stage or a dose of 400 mR. The output from the fifth stage represents a dose of 200 mR, the fourth stage a dose of 100 mR, the third stage a dose 50 mR and the output of the second stage a dose of 25 mR.

The dose at which the alarm is to be actuated is selected by switch 25A. In the example, the switch is set to the output of the fourth stage which is 100 mR (without feedback). Additional switch contacts are provided to connect the switch to the higher stages since the alarm should be actuated when the count is higher than indicated by the output of the fourth stage. For example, as the count progresses to a higher number, the fourth stage may go to a zero condition while the output of the fifth stage goes to a 1 condition. In this case the alarm will continue to be actuated since the fifth stage is also connected to the alarm.

The output of switch 25A is coupled to comparator 28 through resistor 27. In comparator 28 the input voltage is compared to a reference voltage and when the reference voltage is exceed the comparator develops an output signal to operate electronic switch 29. When the stage of scaler 24 which is coupled to comparator 28 goes to a one state, the comparator develops an output signal to operate the electronic switch 29. Electronic switch 29 couples power supply voltage to alarm oscillator 31 which develops an audible tone which can be heard in speaker 32.

Scaler 19 requires 128 input pulses to develop an output pulse and thus divides by 128. In order to change the selectable alarm points on switch 25A feedback circuits can be incorporated in scaler 19. In this example a single feedback circuit from stage 2 to the input of scaler 19 through capacitor 34 and diode 35 provides extra pulses to scaler 19. This has the effect of changing the division ratio from 128 to 96. Other division ratios can be developed by changing the stage from which the feedback pulses are taken. By this means it is possible to change the dose alarm points which can be selected by switch 25A by simply changing the stage to which the feedback network is connected. Additional ratios can be developed by using more than one stage for feedback.

The output of stage 2 of scaler 19 is coupled to the alarm oscillator through capacitor 37 and switch 38. With switch 38 closed every other ionizing event causes alarm oscillator 31 to be turned on for a short time. The time constant of the circuit is sufficiently short so that the output of alarm oscillator 31 sounds like a crackle in speaker 32. This test enables the operator to be sure his dosimeter is working when he is in a radiation field.

An additional output from stage 5 of scaler 21 is coupled to alarm oscillator 31 through capacitor 40. Stage 5 has been selected as the 1.2 mR point in the counter, thus, every time there is an output at the fifth stage of scaler 21 an additional dose of 1.2 mR has been received. The output of stage 5 of scaler 21 acts to turn on alarm oscillator 31 for a brief period of time determined by the time constant of the circuit. This time is longer than that used for the crackle test and results in a "chirp" sound being heard in speaker 32. Thus the user of the dosimeter hears a "chirp" every time a dose of 1.2 mR has been received and has an audible indication of the intensity of the field in which he is working. An increase in the rate at which he is receiving a dose of 1.2 mR may give him a warning to leave the area long before the accumulated dose would reach the selected level. While the crackle and chirp tests have been selected at arbitrary points, it is understood that the stages selected for these tests can be changed as desired.

A sudden increase in the rate of radiation received actuates an alarm to warn the wearer that the dose rate he is receiving is too high. The current through resistor 14, as a result of the ionizing events in GM tube 11, develops a voltage across capacitor 42. The time constant of the circuit is chosen so that as long as the dose rate is below a predetermined level the voltage across capacitor 42 will remain below a selected value. When the dose rate exceeds the predetermined level, the voltage across capacitor 42 rises above the selected value and operates comparator 28 to turn on electronic switch 29. As previously described, this will actuate alarm oscillator 31 to give an audible alarm that the dose rate has been exceeded.

Thus, it can be seen that the pocket dosimeter provides a plurality of alarm functions. The dosimeter provides an output alarm when a preselected dose level is reached. This level can be selected by means of the selector switch 25A. In addition, a test function has been provided to show that the circuit is operating in a radiation field by producing a crackle in the output speaker 32 when test switch 38 is closed. Each time a particular unit of dose is received, in this example 1.2 mR, a chirp is heard in speaker 32. In addition, when the dose rate exceeds a selected level the alarm is actuated even though the accumulated dose is below the alarm level.

The power supply to the various units of the dosimeter is controlled by switches 25B and 25C which are ganged with switch 25A. Switch positions 3 through 7 of switch 25 select the dose level at which an alarm will be given. Switch position 2 is the off position and switch position 1 is the test position.

Power for the dosimeter is provided by battery 50 which is coupled to switch positions 1 and 3 through 7 of switch 25B. With switch 25B in any of the positions 3 through 7 a positive potential from battery 50 is applied to the various units of the power supply as shown in the drawing. Power is supplied to scalers 21 and 24 independently of the position of switch 25B. Thus, scalers 21 and 24 receive power even when the unit is turned off so that any dose stored in these scalers is maintained for readout at a later date.

Referring to FIGS. 1 and 2, a pulse generator 67 is coupled to jack 53 of dosimeter 66. Pulse generator 67 provides a series of pulses which may, for example, be of the order of 1 $\mu$s of a prf of 150 kc. These pulses are applied to scaler 21 input and to actuate the stages of scalers 21 and 24. The pulses are counted by counter 68 connected to the output of pulse generator 67.

Readout of the accumulated dose is accomplished by applying the pulses to dosimeter 66 and counting the pulses with counter 68 until an output is received from the last stage of scaler 24. This output is received on jack 53 through resistor 56. The output from scaler 24 is a change in dc level which is detected by level detector 70 coupled to jack 53 through filter 69. Filter 69 is a low pass filter which rejects the pulses from pulse generator 67. Level detector 70 develops an output signal which turns off generator 67. The number of pulses required to develop an output at the last stage of scaler 24 is the measure of the dose stored in scalers 21 and 24. The dose stores in scaler 19 is of the order of 0.05 mR or less and thus can be neglected in reading out the accumulated dose.

To preset the dosimeter counter 68 is set to develop an output when a predetermined number of pulses are counted. This output is coupled to pulse generator 67 to stop the pulse train. By this means a predetermined number of pulses representing a particular dose can be stored in the dosimeter.

With the switch 25 in position 1 test oscillator 58 is actuated and feeds a series of pulses to the input scaler 19 through capacitor 59 and diode 60. These pulses are counted by scalers 19, 21 and 24 and when an output is developed at the seventh stage of scaler 24 the alarm oscillator 31 is actuated in the manner previously described. This provides a test of the operation of the dosimeter and the scaler stages.

In order to reset the dosimeter the unit must be turned off by placing switch 25 in the second position. With switch 25 in the second position capacitor 62 is coupled to the negative terminal of battery 50 through resistor 63. When the switch 25 is switched to either the test position or a selected radiation level that is position 1 or positions 3 through 7, the positive voltage applied to capacitor 62 develops a pulse. This pulse is applied to the reset terminals of scalers 21 and 24 to reset these scalers to zero. Thus it is possible to reset the counter to a zero level easily whereas in a dosimeter using capacitor integration it is difficult to reset the capacitor to zero because of the stress in the capacitor dielectric.

The embodiments of the invention in which an exclusive property or privilege is claimed are defined as follows:

1. A selectable level dosimeter for monitoring ambient radiation, comprising, radiation detection means for producing pulses in response to the ambient radiation, counting means for counting said pulses and including a plurality of input stages serially coupled to said radiation detection means, a plurality of output stages and a plurality of serially connected intermediate stages coupling said input stages to said plurality of output stages, said output stages being coupled in series whereby a progressively higher number of said input pulses is required to activate consecutive ones of said output stages, alarm means, control switch means for selectively coupling desired ones of said output stages to said alarm means, said alarm means being responsive to an activated one of said output stages coupled thereto to develop an audible alarm.

2. The dosimeter of claim 1 further including, a power supply coupled to said intermediate stages and said output stages, said control switch means being coupled to said power supply and having a plurality of operating positions and an off position, said control switch means in said operating position acting to couple said power supply to said radiation detection means, said input stages and said alarm means and to couple selectively said desired ones of said output stages to said alarm means.

3. The dosimeter of claim 2 further including, reset pulse means having a capacitor coupled to particular stages of said counting means and to said control switch means, said power supply having a first output of one polarity and a second output of another polarity, said control switch means acting to couple said first output to said capacitor with said control switch means in said off position, whereby said capacitor receives a charge according to said one polarity, said control switch means in said operating position acting to couple said second output to said charged capacitor to generate a pulse for resetting said particular counting means stages.

4. The dosimeter of claim 2 further including, a test oscillator coupled to said input stages, said control switch having a test position and being coupled to said test oscillator, said control switch means in said test position acting to supply an operating potential to said test oscillator whereby said oscillator generates pulses representing radiation pulses for testing the operation of the dosimeter.

5. The dosimeter of claim 1 further including, feedback means coupling the output of one stage of said counting means to the input of a preceding stage of said counting means for changing the number of said pulses required to activate said plurality of output stages.

6. The dosimeter of claim 1 further including, capacitor means and auxiliary switch means coupling one of said input stages to said alarm means, said capacitor means developing a momentary pulse in response to the activation of said input stage coupled thereto, closing of said auxiliary switch means acting to couple said momentary pulses to said alarm means to actuate the same to develop an audible noise from said alarm means in response to radiation received by the dosimeter.

7. The dosimeter of claim 1 further including, capacitor means coupling one of said intermediate stages to said alarm means, said one intermediate stage being activated upon receipt of a predetermined dose of radiation by the dosimeter less than the accumulated dose required to activate any of said plurality of output stages, said capacitor means acting to develop a momentary pulse in response to the activation of said one intermediate stage, said alarm means being responsive to said momentary pulse to develop an audible tone for the duration of said momentary pulse to indicate the receipt of said predetermined radiation dose.

8. The dosimeter of claim 1 further including, rate detection means coupled to said radiation detection means to develop a potential proportional to the dose rate of the radiation detected thereby, circuit means coupling said rate detection means to said alarm means for applying said potential thereto, said alarm means being responsive to said potential above a particular level to develop an audible alarm.

9. The dosimeter of claim 1 further including, connecting means coupled to the input of a particular one of said intermediate stages and to the output of the last of said plurality of output stages, preset and test means coupled to said connecting means, said preset and test means including a counter and a test pulse generator, said preset and test means having a first state in which it acts to supply a known number of said test pulses to said counting means whereby the same is preset to said known number, said preset and test means further having a second state in which said test pulses are supplied to said counting means to activate said last of said plurality of output stages, said test pulse generator of said preset and test means being responsive to said activation of said last of said plurality of output stages to stop supplying said test pulses to said counting means, said counter of said preset and test means acting to count said supplied test pulses with the number thereof being a measure of the radiation dose accumulated in the dosimeter.

10. A pocket radiation dosimeter system comprising: radiation countertube means producing output pulses in response to sensed radiation incidents; audio alarm circuit means responsive to said output pulses to produce a first audible indication of radiation level; digital register circuit means responsive to output pulses from said counter-tube means for generating and storing electrical digital signals representative of the total counts from said tube; first circuit means responsive to the digital signals stored in said register means for continuously generating an alarm signal when a predetermined digital signal representative of an alarm dosage level is stored in said register means until said circuit means is reset; and alarm drive circuit means responsive to an alarm signal generated by said first circuit means to drive said audio alarm circuit to produce a second audible indication to override said first audible indication when said alarm dosage level is reached.

11. The system of claim 10 wherein said countertube means is characterized by producing pulses proportional to the number of radiation events sensed, and wherein said audio alarm circuit means includes a transducer, said first audible indication being sensed by the wearer as blips produced by said transducer.

12. The system of claim 10 wherein said digital register circuit means comprises serial electronic counter circuits for storing and generating a digital signal representative of the total number of radiation incidents sensed by said countertube means.

13. The system of claim 12 further comprising range switch means connected in circuit with outputs of said serial counter circuits for selecting one of said outputs as representative of an alarm dosage level, and for transmitting said selected signal to energize said first circuit means.

14. The system of claim 10 further comprising reset circuit means operatively associated with said register circuit means for selectively resetting said register circuit means thereby to reset said first circuit means at the same time.

15. The system of claim 10 wherein said alarm drive circuit means includes an audio oscillator circuit responsive to the signal from said first circuit means for continuously driving said audio alarm circuit to produce said overriding alarm signal.

* * * * *